United States Patent Office 2,941,888
Patented June 21, 1960

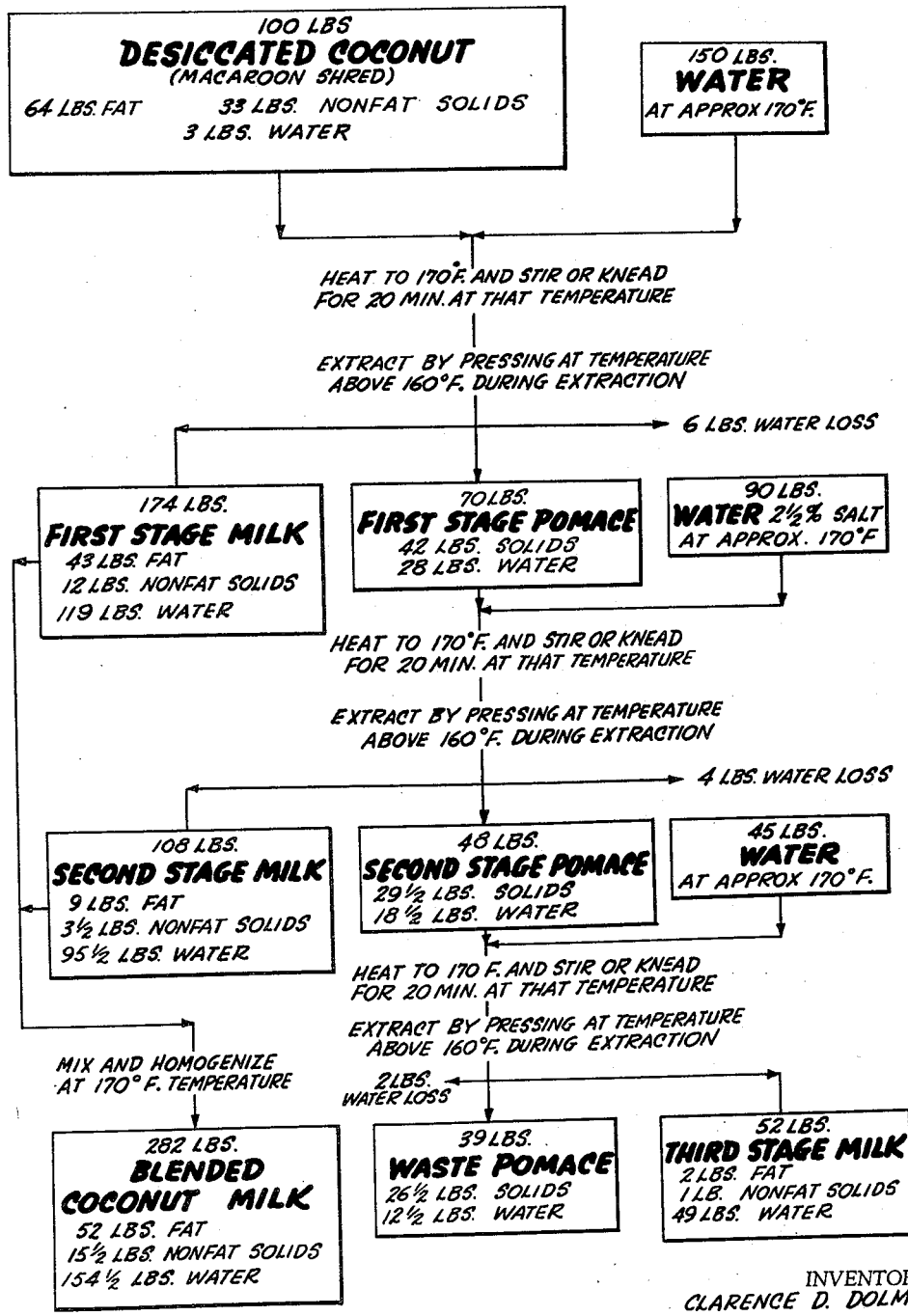

2,941,888

DESICCATED COCONUT MILK EMULSION EXTRACTS AND PROCESSES OF PRODUCING THE SAME

Clarence D. Dolman, Seattle, Wash., assignor to Maurice MacDonald, Seattle, Wash.

Continuation of application Ser. No. 333,084, Jan. 26, 1953. This application Mar. 17, 1958, Ser. No. 721,760

22 Claims. (Cl. 99—125)

This invention concerns a milk emulsion extracted from desiccated coconut and used for human consumption, which contains both fat and nonfat solids. This application is a continuation of the application Serial No. 333,084, filed Jan. 26, 1953, in the name of Clarence D. Dolman.

The term "coconut milk emulsion" as used in this specification, when used generally, designates a stable milk-like emulsion extract of desiccated coconut without limitation to any particular fat content. The term "sweet" denotes such a product which is not sour, rancid, stale, putrescent or spoiled in any other way, and is edible, not containing an objectionable quantity of breakdown products, such as from oxidation, bacterial or enzymatic decomposition, nor containing an excessive proportion of free fatty acid.

It is the principal object of the present invention to provide a nutritious, pleasantly flavored sweet coconut milk emulsion extract which is not only suitable, but very beneficial, for human consumption as a beverage, and which may be incorporated in a wide variety of food products.

It is also an object to provide such a sweet coconut milk emulsion extract which can be produced economically and which will employ as a source material coconut in a form which is readily available in the United States and has characteristics which are stable for an extended period of time.

A further object is to disclose a process suited to the production of such an emulsion extract from the starting product indicated.

Specifically, it is an object to use desiccated coconut as the source material for this sweet milk emulsion extraction process. Desiccated coconut is customarily used as a food and is produced in the form of strips, tapes, chips, shreds, threads or grated granules.

In the product of such a sweet coconut milk emulsion extract it is a further object for the extract to contain fat in the form of a milk-like emulsion as distinguished from an oil, and for the extract also to contain a considerable amount of nonfat nutritional ingredients extracted from the desiccated coconut, including proteins and carbohydrates.

Briefly, the sweet coconut milk emulsion extract is obtained by moistening desiccated coconut and then by pressing such moistened coconut, or by some other mechanical extractive process, extracting from it the sweet milk emulsion to leave a pomace. This pomace may be remoistened and subjected to another extraction operation to produce further sweet milk emulsion which either can be used separately or can be mixed with the first emulsion extract. Both extracts will be generally comparable to sweet cow's milk in having a similar appearance and containing emulsified fat, various proteins, carbohydrates and minerals. The fat, however, is a vegetable fat rather than butter fat.

The drawing presents in diagrammatic form a chart or flow sheet, showing typical components, representative quantities of such components which may be present and the sequence of steps which may be followed in an example of a batch process for extracting the sweet coconut milk emulsion from desiccated coconut.

The production of a "coconut milk" from fresh coconut has been proposed heretofore, but it has not been feasible to produce commercially such a product in the United States. Unless preserved by refrigeration, shelled fresh coconut deteriorates readily, quickly becoming moldy and sour. The cost of refrigerating fresh coconut prior to shipment, during shipment to the United States from coconut-growing localities and during storage in the United States until used is too great to enable fresh shelled coconut to be used as a commercially practical source for coconut milk. The cost of shipping fresh coconuts in the shell from coconut-growing localities to the United States and processing them locally is so great that such coconuts cannot be used economically as a source product for making coconut milk commercially. Moreover, such coconuts are shipped in a rather green condition, which is not the most desirable state for the production of a sweet milk emulsion. Also, frequently even fresh coconuts in the shell spoil during shipment.

It has further been proposed heretofore to produce a milk extract from copra. Copra has been supplied to the United States for many years and is the principal coconut product exported from countries which grow coconuts. Copra is used as the source product for production of coconut oil. Copra is a mass produced with a minimum of quality control and deteriorates in quality by formation of decomposition products both during its preparation and subsequently during shipment to its destination and storage thereafter. Copra consists of the shelled, unpared endosperm or kernel of miscellaneous coconuts, germinated, overripe, underripe, and possibly a few fully ripe ones. After the outer husks are removed, the hard shells and kernels of the nuts are split open so that the kernels will dry to a greater or lesser extent. Drying of the kernel causes it to shrink away from the shell and the shell is then removed but the thin brown coating is not pared off and the pieces of coconut are made and kept as large as possible, many being as large as half of the kernel.

The coconut chunks are collected in a heterogeneous mass and may be dried on the ground by the sun for a period of days to as long as a month. Some copra is dried over fires of coconut sheels, so that it becomes considerably smoked. Ony a small amount of copra is dried in furnaces. The moisture content of copra is always much higher than that of desiccated coconut, which promotes deterioration and putrefaction of the coconut meat by oxidation and by bacterial and enzymatic action. Copra becomes discolored, that is, darkened, deteriorates and tends to become moldy. Since their surface area is proportionately larger, small pieces tend to deteriorate more extensively than large pieces.

The deterioration of unrefrigerated shelled fresh coconut or of copra usually is accompanied by the development of an unpleasant odor, darkening of the meat, the conversion of fat to free fatty acid and the production of other decomposition products. An emulsion extracted from such deteriorated fresh coconut or copra contains at least as high, and usually a higher, proportion of such decomposition products than in the deteriorated fresh coconut or copra itself. Consequently, any coconut milk made in the United States from unrefrigerated shelled fresh coconut or from copra will have an objectionably high content of decomposition products.

Free fatty acids cannot be converted back into fat and, if neutralized with an alkaline material, form soap. Such a soap cannot be removed effectively from an aqueous extract of such deteriorated fresh coconut or copra. Also other obnoxious products of decomposition and deterioration would remain which would render the product unpalatable as a beverage, it would have an unpleasant odor, and would be unsuitable for incorporation in any food product intended for human consumption.

Desiccated coconut is produced by selecting fresh, good nuts from which the shells are chipped with a sharp ax and the thin brown coating is shaved off the kernel. Next, the kernel is washed several times in fresh water. The kernel or endosperm is then grated, shredded or sliced into particles of granular, thread, shred, chip, tape or strip form of desired size. The resulting particles are dried quickly in hot air ovens for about one-half hour to an hour at a temperature of 155° to 185° F. to reduce the moisture content to a value less than 5 percent by weight, and preferably less than 3 percent, without appreciable conversion of fat to free fatty acid. Such rapid dehydration of the fine meat material stabilizes its chemical components, and particularly its fat content, so that the coconut will not deteriorate appreciably for a long period of time if kept dry. Despite the reduction of the coconut meat to small particles before drying and the resulting low moisture content of desiccated coconut, I have discovered that desiccated coconut can be used in the production of a sweet milk emulsion extract containing fat in emulsified form, resembling fresh cow's milk or cream, and that such extract is very palatable. Fresh cow's milk cannot be kept for long periods without being refrigerated, frozen, canned or dehydrated, and the sweet coconut milk emulsion extract of the present invention is similar to cow's milk in this respect.

Being produced from desiccated coconut, the product of the present invention can be made near the market where it is to be sold. Desiccated coconut is readily distinguished from copra because it is always produced and marketed in the form of fine particles, in contrast to coconut chunks of which copra is composed. Consequently there is never any question as to whether the source material is desiccated coconut or copra. Since desiccated coconut does not deteriorate readily, the coconut milk emulsion extract of the present invention can be produced at the places and in the quantities required by demand. The desiccated coconut can, for example, be shipped to arctic regions where cow's milk is wholly unavailable and there used as the source material from which to prepare the sweet coconut milk emulsion of the present invention.

In carrying out the process according to the present invention, it is preferred to use desiccated coconut having shredded particles of the type known in the industry as "macaron shred." Such desiccated coconut is placed in a vessel with liquid for moistening it. Absorption of such liquid by the coconut meat particles causes them to swell. It is preferred that the amount of liquid not be substantially in excess of that which can be absorbed by the coconut so that no appreciable amount of liquid will be left in the vessel after the soaking period. To provide sufficient liquid to serve as a vehicle for extraction of the desired constituents from the coconut meat, however, sufficient liquid should be used to saturate the desiccated coconut. Absorption of the liquid by the desiccated coconut is expedited by heating.

It has been found that 100 pounds of desiccated coconut usually will absorb in a first stage treatment at least 100 pounds of liquid, and perhaps as much as 150 pounds as indicated in the drawing. During such absorption process the desiccated coconut and liquid should be heated to a temperature of at least approximately 170° F., which is sufficient to liquefy the fats in the coconut meat and will greatly facilitate its absorption of water. At this temperature the desiccated coconut will absorb in about twenty minutes nearly the maximum quantity of water which it is capable of absorbing if the mass is stirred or kneaded to insure thorough contact of all the coconut particles with the liquid. While the suggested temperature is not critical, at lower temperatures a longer time is required to complete the absorption of the water by the coconut meat, and the part of the fat content not liquefied will be more difficult to separate from the coconut meat. Moreover, a temperature of 170° F. or more maintained for twenty minutes will pasteurize the mixture and deter enzymatic action.

To complete the first stage of the process, a sweet milk emulsion is separated from the heated and moistened mass, such as by being pressed in a mechanical press. A hydraulic juice press has been found to be quite suitable for this purpose. Pressures of 1400 pounds per square inch have been employed in practice, although screw presses developing only 100 to 200 pounds per square inch can be used. It is preferred that the temperature be held elevated during the pressing, in the vicinity of the temperature during the moistening operation, such as above 160° F. Maintenance of such temperature will reduce the amount of reheating desirable for further processing. By this pressing, a sweet aqueous coconut milk emulsion containing a high percentage of fat is obtained.

Beginning with desiccated coconut of normal fat content, which may be as high as 65 percent by weight, the resulting sweet coconut milk emulsion extract will contain ordinarily 20 percent to 35 percent by weight of fat, comparable to rich cow's cream. This is the major portion, such as one-half to three-quarters, of the initial fat content of the desiccated coconut. Where 150 pounds of aqueous liquid are added to 100 pounds of desiccated coconut containing 64 pounds of fat, the milk emulsion extract weighing 174 pounds may contain 43 pounds of fat, for example. This is a 25 percent fat content and 67 percent of the fat content of the desiccated coconut. Such milk emulsion extract will also contain nonfat solids, principally proteins and carbohydrates, for example 12 pounds, which is 7 percent of the milk by weight, but only a minor part, 36 percent, of the initial nonfat solids of the desiccated coconut, which may be 33 pounds, or 33 percent by weight. Six pounds of water are assumed to have been lost by spillage, evaporation and wetting of equipment.

The residual pomace from the pressing operation is in the form of a white spongy mass weighing 70 pounds, including 28 pounds of water and 42 pounds of solids which still contain considerable fat and the major portion of the nonfat solids. To this pomace is added an aqueous liquid to moisten it and to serve as a vehicle for releasing and removing additional fat and nonfat solids. In this second stage it is preferred that the aqueous liquid be water containing common salt or an equivalent salt in an amount about 1 to 4 percent by weight of the aqueous liquid, a specific example being 2½ percent. The addition of salt to the water has been found highly beneficial in effecting recovery of optimum amounts of proteins and carbohydrates. In this step preferably sufficient water is added so as generally to suspend the coconut particles in water, but less water proportionately is added than for the first stage extraction.

It has been found that approximately 90 pounds of water added to the residual pomace of about 70 pounds from the first extratcion will produce a mixture of suitable consistency in this second stage. To expedite moistening of the pomace, the mass preferably again is heated to a temperature of approximately 170° F. and maintained at that temperature for about twenty minutes while the mass is stirred or kneaded. The coconut thus remoistened is pressed at a temperature above 160° F. to extract a second milk emulsion, containing 5 percent to 10 percent of fat by weight, for example 8⅓ percent or 9 pounds in 108 pounds of milk emulsion. Such fat may be 11 percent to 17 percent of the initial fat content of the desiccated coconut. Four pounds of water are assumed to have been lost by spillage, evaporation and wetting of equipment. About 48 pounds of pomace are left, composed of about 29½ pounds of solids and 18½ pounds of water.

The milk emulsion extract will contain a lower proportion of fat to nonfat solids than the emulsion extracted in the first pressing operation. The nonfat solids content may be 3½ pounds or 3.2 percent by weight, which is 10.6 percent of the initial nonfat content of the desiccated coconut.

While the extraction process composed of the two extraction steps described above can be considered complete, a third extraction stage is feasible and frequently economically desirable. In the third stage, water is mixed with the residual pomace of the second pressing operation. A smaller proportion of water to the material to be moistened can be used than in either of the first two stages because of the crushed condition of the solid material. Such proportion is not critical, however, and even a greater proportion of water can be used if desired. It is preferred, however, to use the minimum amount of water which will remove the greatest amount of solids. Thus, for example, 45 pounds of water can be mixed with the 48 pounds of second stage residual pomace and, as in the first two stages, the water and coconut can be stirred or kneaded while being maintained at a temperature of approximately 170° F. for about twenty minutes. The 52 pounds of milk emulsion extract produced by pressing the remoistened pomace at a temperature above 160° F. will contain perhaps 3 to 5 percent of fat by weight, for example 2 pounds or 4 percent, which is about 3 percent of the initial fat content of the desiccated coconut, and some additional nonfat solids, such as 1 pound. It is assumed that 2 pounds of water are lost by spillage, evaporation and wetting of equipment.

The milk emulsions extracted in the first and second stages, 174 pounds and 108 pounds, respectively, which may have been kept at or near a temperature of 170° F., may be blended to constitute 282 pounds of final coconut milk emulsion. The fat content of this blended milk emulsion is 52 pounds or 18½ percent by weight, and the milk emulsion contains 15½ pounds of nonfat solids, or 5½ percent by weight. The third milk emulsion extract can also be mixed with the milk emulsions extracted in the first two pressing steps. The 334 pounds of resulting milk emulsion blend would have a fat content of 54 pounds or about 16 percent by weight, and a nonfat content of 16½ pounds or about 5 percent by weight.

The milk emulsion extracts from the first and second stages, with or without that from the third stage, are homogenized to produce the final milk emulsion product. This product can be diluted with water or concentrated by evaporation, influenced by the amount of water used in the extraction process, to provide a sweet coconut milk emulsion of the desired fat content corresponding to cream, whole milk or skim milk produced from cows, depending upon the use for which the coconut milk emulsion is intended. The coconut milk emulsion having any given percent by weight of emulsified coconut fat will be at least as rich in appearance and taste as cow's milk having a proportion by weight of butter fat equal to the proportion by weight of coconut fat.

During the homogenzation process the coconut milk emulsion can, if desired, be diluted for incorporation in various food products until it contains by weight about 15 percent fat, and 4½ percent of nonfat solids. Such solids may contain from 1¼ percent to 2¼ percent of proteins, such as approximately 1¾ percent, and from 2¼ percent to 3¼ percent of carbohydrates, such as approximately 2¾ percent. Such milk emulsion can be still further diluted for beverage purposes. The proportions of the various ingredients will vary depending upon the type, procedure and effectiveness of the extracting operations, and the initial composition of the desiccated coconut affected by the variety of coconut, the growing conditions, climate and ripeness of the coconuts used. In the typical example given the ratio of nonfat solids to fat, that is, the ratio of proteins and carbohydrates to fat, will be approximately 0.3 to 1 in the final milk emulsion formed by combining the milk extracted in the first and second stages.

While, as stated, it is preferred that the first two, or all three, of the milk emulsion extracts be blended to constitute the final coconut milk emulsion product, any or all of such extracts can be used for food purposes separately from the others. Each extract or blends of them can be used as a beverage and in the preparation of frozen desserts, custards, ice cream, coatings, toppings and other foods in place of cow's milk of comparable butter fat content. The fat content can be increased by evaporation of water or decreased by dilution with water in each instance to provide the type of product desired for a particular use.

It will be found that any of these sweet coconut milk emulsions are very comparable to cow's milk in keeping quality. Unless the coconut milk is homogenized, cream will rise to the top as in cow's milk.

Instead of combining the milk emulsion extract obtained from the third pressing step with the first two milk emulsion extracts, it can be used as at least part of the aqueous liquid employed in the first or second processing step for moistening a different batch of desiccated coconut or pomace. Such an emulsion obtained from a third pressing stage will be absorbed even more readily than water into desiccated coconut and will extract fat and nonfat solid components of coconut more effectively than water alone, as well as itself adding solids to the milk emulsion extract. The waste pomace from the final pressing, whether the second stage or the third stage, may be discarded.

In summary, in the production of the sweet coconut milk emulsion product of the present invention, it is essential that desiccated coconut be used as the source material. Such coconut has been shelled, its thin brown coating pared off and the meat finely divided and quickly and thoroughly dehydrated in hot air ovens. Its physical and chemical properties thus have been stabilized so that appreciable deterioration or decomposition of the meat is prevented for an extended period of time. For economical utilization of desiccated coconut in the production of coconut milk emulsion the coconut is moistened and pressed at least twice. The process also preferably employs a sweet milk emulsion extracted in a third stage extraction to moisten the coconut meat prior to a pressing operation, or the emulsion from such third stage extraction is blended with coconut milk extracted in a first and/or a second extraction stage.

The first milk emulsion extract will contain by weight approximately 50 percent to 75 percent of the initial fat content of the desiccated coconut and approximately 30 percent to 40 percent of the initial nonfat solids of the desiccated coconut. The ratio of nonfat solids to fat in such first milk emulsion could thus vary from 0.2 to 0.4. The second milk emulsion extract will contain approximately 11 percent to 17 percent of the initial fat content of the desiccated coconut and approximately 9 percent to 12 percent of the initial nonfat solids of the desiccated coconut. In this second extract, therefore, the ratio of nonfat solids to fat could vary from 0.275 to 0.55. In processing any given batch of coconut the ratio of nonfat solids to fat in the second milk emulsion extract would be higher than such ratio in the first extract. These first and second milk emulsion extracts from the desiccated coconut together will contain approximately from 65 percent to 90 percent of the initial fat content of the desiccated coconut and approximately from 40 percent to 50 percent of the initial nonfat solids of the desiccated coconut. In a blend of the first and second fresh milk emulsions the ratio of nonfat solids to fat would be from 0.23 to 0.4.

The sweet coconut milk emulsion obtained from each extraction stage in the process of the present invention utilizing desiccated coconut as a source material and any blend of such extracts can be distinguished from coconut milk emulsions extracted from copra or from fresh coconut by the difference in iodine number or value. Iodine number or value is defined in the test Food Analysis by A. G. Woodman, Third Edition, 1931, published by the McGraw-Hill Company, at page 169, as follows: "The iodine number is the number of grams of iodine absorbed by 100 grams of the oil." In this definition "oil" is synonymous with the fat content of coconut.

In tests using the Wijs method mentioned at the middle of page 169 of the Food Analysis text and described in the publication Official Methods of Analysis, Eighth Edition, 1955, published by the Association of Official Agriculture Chemists, Washington, D.C., paragraph No. 2618, page 465, it has been established that the iodine number of the fat in the sweet coconut milk extracted from desiccated coconut is within the range of 7 to 9, varying with the source of the desiccated coconut. The iodine number for milk emulsion extracts from comminuted shelled fresh coconut was 9.1 to 9.8. The iodine number of milk emulsion extracted from copra was 10.6. These higher iodine numbers for milk emulsion extracts from fresh coconut and copra than for the milk emulsion extracts from desiccated coconut indicates that a higher proportion of the fat in the milk emulsion extracts from fresh coconut and from copra is in unsaturated form as compared with the fat in the milk emulsion extracts from desiccated coconut. Such unsaturated portion of the fat content is more susceptible to deterioration than the saturated fat, and slight deterioration may produce a disagreeable taste or unpleasant odor.

It has been found that the milk emulsion extracts from deteriorated fresh coconut and from copra are unpalatable because of the presence of deterioration or decomposition products. No known treatment will remove such deterioration or decomposition products extracted from copra or from deteriorated fresh coconut in producing milk emulsions from them to convert such extracts into palatable sweet coconut milk products having an acceptable odor and taste suitable for use as a beverage or for incorporation in food products. For that reason such source materials are unsatisfactory, whereas I have found desiccated coconut to be a consistently reliable and satisfactory source material for utilization in the production of edible sweet coconut milk emulsion extract.

As has been mentioned, deteriorated fresh coconut and copra contain a considerably higher proportion of free fatty acid than desiccated coconut. Such free fatty acid is produced by deterioration and decomposition. Consequently, the acid value of the fat in such deteriorated fresh coconut and copra will be higher than that of the fat in desiccated coconut. The term "acid value" or "acid number" is defined, at page 168, as "the milligrams of potassium hydroxide required to neutralize the free fatty acids in 1 gram of oil," in the text Food Analysis by A. G. Woodman, Third Edition, 1931, published by the McGraw-Hill Company. For desiccated coconut, the range of acid value is from a small fraction to 1.5, whereas the acid value range for deteriorated fresh coconut or copra is from 4 to 20.

I claim as my invention:

1. The process of producing sweet coconut milk emulsion from desiccated coconut, which comprises mixing aqueous liquid with desiccated coconut for absorption thereby, separating from such moistened coconut a sweet milk emulsion containing nonfat solids and a major portion of the fat content of the desiccated coconut, mixing aqueous liquid with the pomace from which such milk emulsion was separated, for moistening such pomace, separating from such moistened pomace a sweet milk emulsion containing fat and nonfat solids of the desiccated coconut, and blending such two sweet milk emulsions into a blended sweet coconut milk emulsion.

2. The process defined in claim 1, in which the aqueous liquid mixed with the desiccated coconut and with the pomace is heated to facilitate its absorption.

3. The process defined in claim 2, in which the aqueous liquid is at a temperature of at least about 170° F.

4. The process defined in claim 1, in which the aqueous liquid mixed with the desiccated coconut is heated to a temperature of at least about 170° F. to facilitate its absorption by the desiccated coconut and is maintained at approximately such temperature during such absorption for a period of approximately twenty minutes prior to the separating operation.

5. The process defined in claim 1, in which the quantity of aqueous liquid added to the desiccated coconut is small enough so that substantially all of it can be absorbed by the desiccated coconut and which quantity is large enough substantially to saturate the desiccated coconut.

6. The process defined in claim 1, in which at least one of the aqueous liquids added is a saline solution.

7. The process defined in claim 1, in which the aqueous liquid added to the pomace is a saline solution.

8. The process defined in claim 1, including adding aqueous liquid to the pomace resulting from the second separating operation, separating from such remoistened pomace a further sweet milk emulsion, and utilizing such further sweet milk emulsion as part of the aqueous liquid mixed with coconut prior to one of the first two separating operations.

9. The process of producing sweet coconut milk emulsion from desiccated coconut, which comprises mixing aqueous liquid with desiccated coconut for absorption thereby, separating from such moistened coconut a sweet milk emulsion containing fat and nonfat solids, mixing aqueous liquid with the pomace from which such milk emulsion was separated, for moistening such pomace, separating from such moistened pomace a sweet milk emulsion containing a ratio of nonfat solids to fat different from the ratio of nonfat solids to fat in the first milk emulsion separated, and blending such two sweet milk emulsions into a blended coconut milk.

10. The process of producing sweet coconut milk emulsion from desiccated coconut, which comprises mixing aqueous liquid with desiccated coconut for absorption thereby, separating from such moistened coconut a sweet milk emulsion containing nonfat solids and a major portion of the fat content of the desiccated coconut, mixing aqueous liquid with the pomace from which such milk emulsion was separated, for moistening such pomace, separating from such moistened pomace a sweet milk emulsion containing a ratio of nonfat solids to fat higher than the ratio of nonfat solids to fat in the first milk emulsion separated, and blending such two sweet milk emulsions into a blended sweet coconut milk emulsion.

11. The process of producing sweet coconut milk emulsion from desiccated coconut, which comprises mixing with desiccated coconut a quantity of aqueous liquid of a weight at least equal to the weight of the desiccated coconut, heating the aqueous liquid and desiccated coconut to a temperature of at least about 170° F. and maintaining them at about such temperature for approximately 20 minutes to facilitate absorption of the aqueous liquid by the desiccated coconut, separating a sweet milk emulsion from such moistened coconut, mixing a saline aqueous liquid and the pomace from which such milk emulsion was separated, for moistening such pomace, heating the mixture of saline aqueous liquid and pomace to a temperature of at least about 170° F. and maintaining such mixture at about such temperature for approximately 20 minutes, separating a sweet milk emulsion from such moistened pomace, and blending such two milk emulsions into a blended sweet coconut milk emulsion.

12. The process of producing sweet coconut milk emulsion from desiccated coconut, which comprises mixing aqueous liquid with desiccated coconut, heating the moistened coconut, separating a sweet milk emulsion from such moistened coconut, mixing aqueous liquid with the pomace from which such milk emulsion was separated, for moistening such pomace, heating the moistened pomace, and separating a sweet milk emulsion from such moistened pomace, the total weight of aqueous liquid added to the desiccated coconut and to the pomace being at least approximately as great as the weight of such desiccated coconut, and such milk emulsions together containing a major portion of the fat content of the desiccated coconut.

13. The process of producing sweet coconut milk emulsion from desiccated coconut, which comprises mixing aqueous liquid with desiccated coconut, separating a sweet milk emulsion from such moistened coconut, mixing aqueous liquid with the pomace from which such milk emulsion was separated, for moistening such pomace, and separating a sweet milk emulsion from such moistened pomace, the total weight of aqueous liquid added to the desiccated coconut and to the pomace being at least approximately as great as the weight of such desiccated coconut, and such milk emulsions together containing a major portion of the fat content of the desiccated coconut.

14. The process of producing sweet coconut milk emulsion from desiccated coconut, which comprises mixing aqueous liquid with desiccated coconut for absorption thereby, separating a sweet milk emulsion from such moistened coconut, mixing aqueous liquid with the pomace from which such milk emulsion was separated, for moistening such pomace, separating a sweet milk emulsion from such moistened pomace, blending such two sweet milk emulsions into a blended sweet coconut milk emulsion, and, to the extent made necessary by the richness of the blended sweet coconut milk emulsion, adding water thereto for diluting it and thereby reducing its percentage of fat to that desired for the particular use for which the diluted, blended sweet coconut milk emulsion is intended.

15. The process of producing sweet coconut milk emulsion from desiccated coconut, which comprises mixing aqueous liquid with desiccated coconut for absorption thereby, separating a sweet milk emulsion from such moistened coconut, mixing aqueous liquid with the pomace from which such milk emulsion was separated, for moistening such pomace, separating a sweet milk emulsion from such moistened pomace, and blending such two sweet milk emulsions into a blended sweet coconut milk emulsion.

16. The process of producing sweet coconut milk emulsion from desiccated coconut, which comprises mixing aqueous liquid with desiccated coconut for absorption thereby, separating a sweet milk emulsion from such moistened coconut, mixing aqueous liquid with the pomace from which such milk emulsion was separated, for moistening such pomace, and separating a sweet milk emulsion from such moistened pomace.

17. The process of producing sweet coconut milk emulsion from desiccated coconut, which comprises mixing aqueous liquid and desiccated coconut for absorption thereby, separating from such moistened coconut a sweet milk emulsion containing fat and nonfat solids of the desiccated coconut, mixing a saline aqueous liquid with the pomace from which such milk emulsion was separated, for moistening such pomace, and separating a sweet milk emulsion from such moistened pomace.

18. In a process of producing sweet coconut milk emulsion from desiccated coconut, the steps of mixing a saline aqueous liquid with coconut meat material for absorption thereby, and separating from such moistened coconut meat material a sweet milk emulsion containing fat and nonfat solids of the coconut.

19. A sweet coconut milk emulsion comprising a saline aqueous milk emulsion extract of desiccated coconut containing fat and nonfat solids of desiccated coconut.

20. A sweet coconut milk emulsion comprising a saline aqueous milk emulsion coconut extract containing fat having an iodine number within the range of 7 to 9.

21. A sweet coconut milk emulsion comprising a blend of at least two successive aqueous milk emulsion extracts from the same desiccated coconut, one of said extracts containing a substantially higher ratio of nonfat solids to fat than another of such extracts, and one of said extracts being a saline extract.

22. The process of extracting, when and where desired, a coconut emulsion from previously dried edible coconut endosperm comprising: taking a quantity of previously dried and sanitary endosperm from selected, ripe coconuts; adding a substantial amount of aqueous liquid to said quantity of endosperm; maintaining the mixture at an elevated temperature by the application of heat thereto; separating the liquid from the residue by application of considerable pressure; adding a substantial amount of aqueous liquid to said residue; maintaining the mixture at an elevated temperature for a substantial period of time by application of heat thereto; and separating the liquid from the residue by application of considerable pressure; the total amount of aqueous liquid added at least approximating the initial weight of the dried endosperm; the separated liquids being in the form of a coconut emulsion, and the final residue being deprived of the major portion of its fat content.

References Cited in the file of this patent

UNITED STATES PATENTS

| | | |
|---|---|---|
| 145,722 | Classon | Dec. 23, 1873 |
| 163,962 | Ashbourne | June 1, 1875 |
| 1,374,879 | Cookson | Apr. 12, 1921 |

FOREIGN PATENTS

| | | |
|---|---|---|
| 174,527 | Great Britain | Feb. 2, 1922 |